United States Patent [19]

Kerko et al.

[11] Patent Number: 5,403,789
[45] Date of Patent: Apr. 4, 1995

[54] ULTRAVIOLET ABSORBING, FIXED TINT BROWN SUNGLASS

[75] Inventors: David J. Kerko, Corning, N.Y.; Wagner R. Lozano, Mogi das Cruzes, Brazil; David W. Morgan, Corning, N.Y.

[73] Assignee: Corning Incorporated, Corning, N.Y.

[21] Appl. No.: 202,774

[22] Filed: Feb. 28, 1994

[51] Int. Cl.$^6$ .......................... C03C 3/089; C03C 4/08
[52] U.S. Cl. ......................... 501/65; 501/66; 501/67; 501/71; 501/905
[58] Field of Search ................ 501/65, 66, 67, 71, 501/905

[56] References Cited

U.S. PATENT DOCUMENTS

| | | | |
|---|---|---|---|
| 2,937,952 | 5/1960 | Smith | 501/70 |
| 5,256,607 | 10/1993 | Kerko et al. | 501/65 |
| 5,268,335 | 12/1993 | Kerko et al. | 501/905 X |

*Primary Examiner*—Karl Group
*Attorney, Agent, or Firm*—C. S. Janes, Jr.

[57] ABSTRACT

A transparent glass which, at a thickness of 2 mm, transmits less than 1% of ultraviolet radiation having a wavelength of 380 nm and exhibits a brown fixed tint bounded by apices A, B, D, F, A of the drawing, a purity between 48–70%, and a dominant wavelength between 580–588 nm, said glass having a composition consisting essentially, expressed in terms of weight percent on the oxide basis, of

| | | | |
|---|---|---|---|
| $SiO_2$ | 65–72 | CaO | 0–5.5 |
| $B_2O_3$ | 3–8 | ZnO | 0–4 |
| $Na_2O$ | 6–10 | CaO + ZnO | 2–5.5 |
| $K_2O$ | 7–12 | $Fe_2O_3$ | 3–5 |
| $Na_2O + K_2O$ | 15–20 | Se | 0.01–2 |
| $Al_2O_3$ | 0–4 | NiO | 0–0.12. |

3 Claims, 1 Drawing Sheet

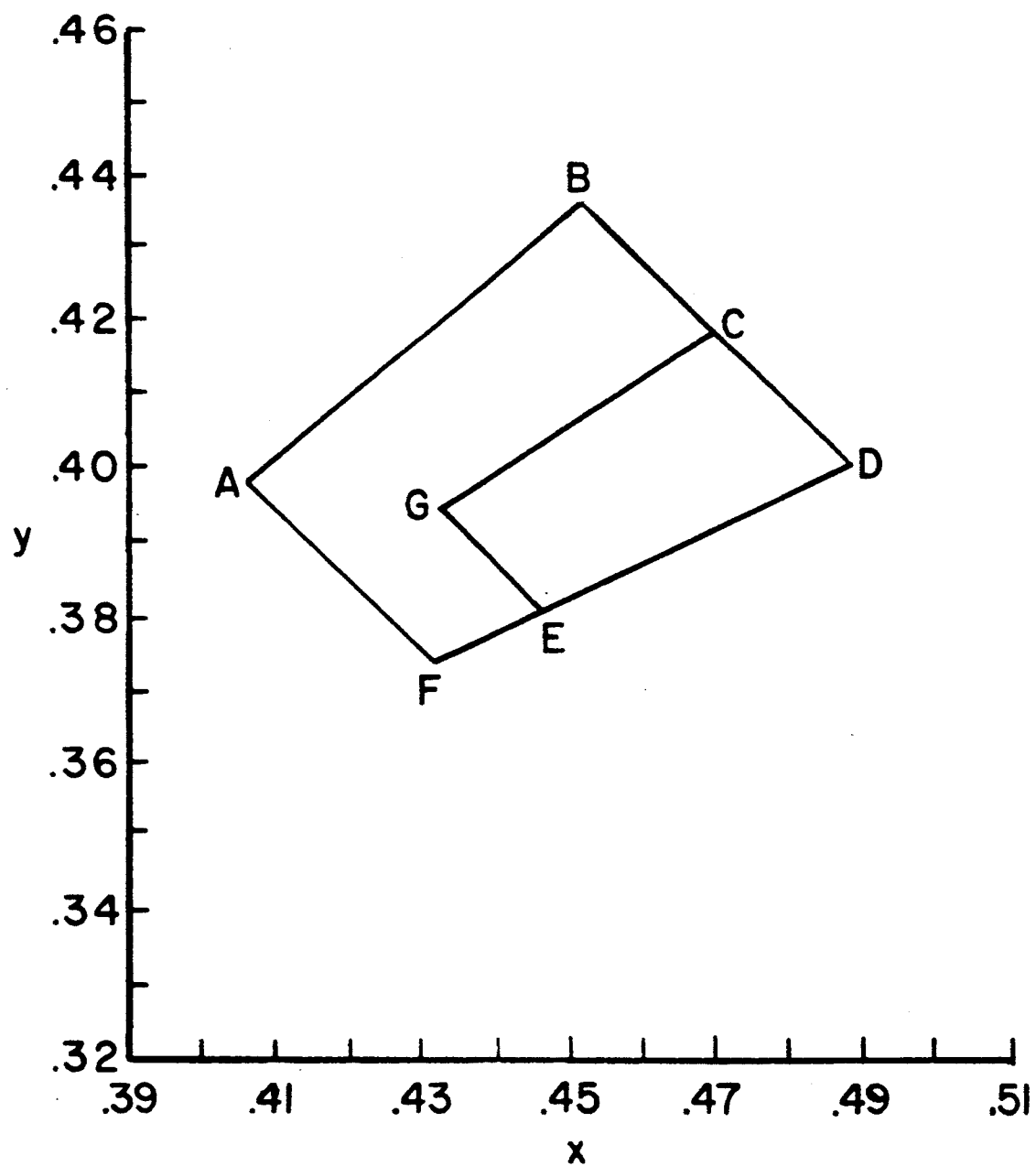

ULTRAVIOLET ABSORBING, FIXED TINT BROWN SUNGLASS

RELATED APPLICATION

U.S. application Ser. No. 08/202,777, filed concurrently herewith and assigned to the same assignee as the present application by D. J. Kerko and D. W. Morgan under the title ULTRAVIOLET ABSORBING, FIXED TINT GREEN SUNGLASS, discloses glasses designed for ophthalmic applications which, at a thickness of 2 mm, transmit less than 1% of ultraviolet radiation having a wavelength of 380 nm and exhibit a green coloration having a dominant wavelength between 554–564 nm and a purity between 18–32%. The glasses consist essentially, expressed in terms of weight percent on the oxide basis, of

| | | | |
|---|---|---|---|
| $SiO_2$ | 65–72 | $Na_2O + K_2O$ | 15–21 |
| $B_2O_3$ | 3–8 | CaO | 0–4 |
| $Al_2O_3$ | 0.5–5 | ZnO | 0–4 |
| $Na_2O$ | 6–12 | CaO + ZnO | 1–4 |
| $K_2O$ | 6–12 | $Fe_2O_3$ | 4.8–7. |

BACKGROUND OF THE INVENTION

In recent years both governmental and private agencies have stressed the damage which can result when eyes are exposed to bright sunlight, this damage being caused primarily by exposure to wavelengths in the ultraviolet portion of the radiation spectrum. Therefore, glass manufacturers have been active in designing compositions for sunglasses which will essentially block the transmittance of ultraviolet radiation. U.S. Pat. No. 5,256,607 (Kerko et al.) and U.S. Pat. No. 5,268,335 (Kerko et al.) present two disclosures directed to the production of such glasses.

U.S. Pat. No. 5,256,607 describes glass compositions suitable for use as sunglasses which exhibit a neutral gray fixed tint coloration and limit the transmittance of ultraviolet radiation at a wavelength of 380 nm to no more than 1% at a thickness of 2 mm. The glass compositions are preferably essentially free of ZnO and consist essentially, expressed in terms of weight percent on the oxide basis, of

| | | | | | |
|---|---|---|---|---|---|
| $SiO_2$ | 65–72 | $K_2O:Na_2O$ | 1.25–2.25 | $As_2O_3$ | 0–0.3 |
| $B_2O_3$ | 2–6 | $Al_2O_3$ | 0–2.25 | $Fe_2O_3$ | 4.8–6.2 |
| $Na_2O$ | 6–10 | CaO | 0–1.5 | $Co_3O_4$ | 0.012–0.02 |
| $K_2O$ | 10–16 | $Al_2O_3$ + CaO | 0–1.5 | NiO | 0.16–0.21. |
| $Na_2O + K_2O$ | 17–23 | | | | |

The high concentration of iron provided the required absorption of ultraviolet radiation. Cobalt and nickel were added to adjust the chromaticity of the glass to a neutral target. $Al_2O_3$, $B_2O_3$, and/or CaO were included to assist in suppressing the transmittance of the glass at a wavelength of 380 nm to below 1% at a thickness of 2 mm.

U.S. Pat. No. 5,268,335 discloses the fabrication of ophthalmic lenses which can be chemically strengthened to high values with surface compression layers of substantial depth through short treatments and which restrict the transmittance of ultraviolet radiation at 380 nm to no more than 1% at a thickness of 2 mm. Iron was utilized to achieve the demanded low transmittance of ultraviolet absorption and, where a neutral gray coloration was desired, cobalt and nickel were included. The base compositions therefor were preferably free of ZnO and consisted essentially, expressed in terms of weight percent on the oxide basis, of

| | | | | | |
|---|---|---|---|---|---|
| $SiO_2$ | 55–65 | $Na_2O$ | 6–18 | $TiO_2$ | 0–4 |
| $B_2O_3$ | 5–20 | $K_2O$ | 2–10 | $ZrO_2$ | 0–7 |
| $Al_2O_3$ | 4–10 | $Li_2O + Na_2O + K_2O$ | 13–22 | $MgO + TiO_2 + ZrO_2$ | 0–10 |
| $B_2O_3 + Al_2O_3$ | 14–26 | CaO | 0–1.5 | $As_2O_3$ | 0–0.5 |
| $Li_2O$ | 0–3 | MgO | 0–4 | ZnO | 0–1.5. |

Where other tints are desired in the glass, the patent cited the use of $Co_3O_4$, $Cr_2O_3$, CuO, $Fe_2O_3$, $MnO_2$, NiO, $V_2O_5$, Au, Pd, and rare earth metal oxides.

The patent also disclosed a glass commercially marketed by Corning Incorporated, Corning, N.Y., which exhibits a neutral gray fixed tint and limits the transmittance of ultraviolet radiation at 380 nm to no more than 1% at a thickness of 2 mm. An analysis of that glass, marketed under Corning Code 8015, is tabulated below expressed in terms of weight percent on the oxide basis:

| | | | | | |
|---|---|---|---|---|---|
| $SiO_2$ | 68.41 | $K_2O$ | 9.71 | $Co_3O_4$ | 0.021 |
| $Al_2O_3$ | 0.51 | ZnO | 6.76 | NiO | 0.126 |
| $Na_2O$ | 8.81 | $Fe_2O_3$ | 5.54 | $As_2O_3$ | 0.111. |

There has been a need for a glass suitable for ophthalmic applications exhibiting a brown fixed tint of a desirable hue that can be chemically strengthened to high values with surface compression layers of significant depth, and which limits the transmittance of ultraviolet radiation at 380 nm to no more than 1% at a thickness of 2 mm.

Fixed tint brown ophthalmic glasses which are chemically strengthenable are known in the art. Code 8079 glass, marketed by Corning Incorporated, is illustrative of such. An analysis thereof is set out below, expressed in terms of weight percent on the oxide basis.

| | | | | | |
|---|---|---|---|---|---|
| $SiO_2$ | 65.4 | CaO | 6.0 | NiO | 0.48 |
| $Al_2O_3$ | 7.0 | ZnO | 3.0 | $V_2O_5$ | 0.40 |
| $Na_2O$ | 13.9 | $TiO_2$ | 0.25 | $As_2O_3$ | 0.10 |
| $K_2O$ | 2.6 | $Fe_2O_3$ | 0.28 | $Sb_2O_3$ | 0.60. |

The brown color is imparted to the glass through a combination of a relatively high concentration of NiO with a low level of $Fe_2O_3$. Unfortunately, however, its transmittance of ultraviolet radiation at a wavelength of 380 nm is greater than 30%.

A fixed tint brown ophthalmic glass which absorbs strongly in the ultraviolet region of the radiation spectrum is marketed by Bausch and Lomb, Inc., Rochester, N.Y., under the designation B-15. That glass has the following approximate composition, expressed in terms of weight percent on the oxide basis:

| | | | | | |
|---|---|---|---|---|---|
| $SiO_2$ | 69.1 | $K_2O$ | 9.8 | NiO | 0.11 |

-continued

| | | | | | |
|---|---|---|---|---|---|
| Al₂O₃ | 0.49 | ZnO | 6.1 | Se | 0.046 |
| Na₂O | 8.2 | Fe₂O₃ | 5.8 | As₂O₃ | 0.40 |

Because the strain point of that glass is so low, viz., about 435° C., it encounters problems in chemical strengthening in the standard commercial white crown glass salt bath; i.e., immersion for 2 to 16 hours in a bath of molten KNO₃ operating at a temperature of 450° C. For effective chemical strengthening brought about by exchanging potassium ions from the salt bath with sodium ions in the glass surface, the strain point of the glass must be higher than the temperature of the salt bath; in this instance higher than 450° C.

Therefore, the principal objective of the present invention was to devise glass compositions suitable for ophthalmic applications which exhibit a brown fixed tint, which exhibit a transmittance to ultraviolet radiation at a wavelength of 380 nm of less than 1%, which will exhibit a transmittance having a dominant wavelength between 580–588 nm with a purity of 48–70%, which exhibit a refractive index of 1.523, and which can be chemically strengthened.

SUMMARY OF THE INVENTION

That objective can be achieved in glasses having base compositions consisting essentially, expressed in terms of weight percent on the oxide basis:

| | | | |
|---|---|---|---|
| SiO₂ | 65–72 | CaO | 0–5.5 |
| B₂O₃ | 3–8 | ZnO | 0–4 |
| Na₂O | 6–10 | CaO + ZnO | 2–5.5 |
| K₂O | 7–12 | Fe₂O₃ | 3–5 |
| Na₂O + K₂O | 15–20 | Se | 0.01–2 |
| Al₂O₃ | 0–4 | NiO | 0–0.12 |

As employed herein, the expression "consisting essentially of" renders the glass composition open only for the inclusion of unspecified ingredients which do not materially affect the basic and novel characteristics of the glass. In general, the total of all such inclusions will be less than about 5%.

As was explained in U.S. Pat. No. 5,268,335, supra, optical and ophthalmic laboratories have been, and are continuing to be, under increasing governmental and private agency pressure to reduce the concentration of zinc released in the effluent created by their finishing operations. Therefore, whereas ZnO may be substituted for part or all of the CaO, not only because of the above-described environmental concerns, but also because the redox conditions during melting require more exacting control with ZnO-containing glass melts, the preferred subject inventive glasses have compositions which are essentially free of ZnO. As used herein, "essentially free of ZnO" indicates that no substantial amount of a ZnO-containing material is intentionally included in the glass composition.

As was also explained in U.S. Pat. No. 5,268,335, supra, the presence of CaO in a glass composition has customarily been observed to retard the ion exchange taking place between potassium ions from a salt bath and sodium ions present in the glass surface. That action of CaO leads to a shallower depth of the surface compression layer even after relatively long exchange periods which, while providing a very substantial initial improvement in mechanical strength, can result in a considerable reduction in strength as a consequence of surface abuse suffered by the glass during use in service.

Quite surprisingly, the substantial quantities of CaO in the inventive glasses do not appear to adversely affect their capability of being chemically strengthened, inasmuch as the phenomenon customarily encountered of the development of shallow compression layers has not been observed in the inventive glasses. It has been conjectured that the presence of B₂O₃ exerts some influence in securing surface compression layers of desirable depth.

In discussing Corning Code 8079 glass above, it was observed that, whereas that glass exhibits a brown fixed tint and is chemically strengthenable, its transmittance of ultraviolet radiation is much too high in today's sunglass market. Glass B-15 of Bausch and Lomb was also discussed, it being pointed out that the reduction in ultraviolet transmission displayed by that glass involved the use of much higher levels of iron oxide than are found in Corning Code 8079 glass. When higher levels of iron oxide are utilized to achieve the desired color and absorption of ultraviolet radiation, the refractive index must be adjusted to 1.523 by removing either alkali metal oxides, alkaline earth metal oxides, and/or zinc oxide. When iron oxide replaces alkaline earth oxides and/or zinc oxide, the temperature of the strain point drops quite rapidly. As was observed above, for suitable ion exchange strengthening utilizing the replacement of sodium ions in the glass with potassium ions from the standard bath of molten KNO₃ operating at 450° C., the glass must demonstrate a strain point higher than 450° C. The subject inventive glasses exhibit strain points of at least 460° C.

When iron oxide was substituted for part of the alkali metal oxide content of Corning Code 8079 glass, glasses with strain points high enough for chemical strengthening were produced. That substitution, however, led to glasses that proved difficult to melt because of their high viscosities in the melting region. Because of anticipated melting and forming problems and the excessive volatilization of selenium due to the need for higher melting temperatures, that approach was abandoned.

The inventive glasses resulted from substantial additions of iron oxide, expressed as Fe₂O₃, in substitution for Al₂O₃, ZnO, and a minor reduction in CaO content, plus the inclusion of significant amounts of B₂O₃. Arsenic oxide or a combination of sodium chloride and sodium bromide can comprise fining agents for the inventive glasses. The use of this latter combination results in a much more reduced glass. Compensation for that circumstance can be made, however, by adjusting the ratio of the iron oxide batch materials; e.g., adjusting the ratio of iron oxalate to iron (+3 valence) oxide batch materials.

As can be appreciated, Fe₂O₃ concentrations of 3% by weight and higher impart a distinct green coloration to the glass. To achieve the desired brown coloration, selenium in amounts up to 2% by weight are incorporated, the hue of which can be adjusted through the addition of nickel, expressed in terms of NiO. The appended drawing illustrates the "color box" of chromaticity coordinates (x,y), as determined employing a conventional tristimulus colorimeter with Illuminant C. Hence, the desired brown tint lies within the area A, B, C, D, E, F, A of the drawing, with the preferred glasses exhibiting tints within area C, D, E, G, C. Accordingly, in the basic glasses the dominant wavelength will range between 580–588 nm at a purity of 48–70%. In the preferred glasses the dominant wavelength will range between 584–588 at a purity of 54–70%. In general, the level of $K_2O$ in the glass will be held higher than that of $Na_2O$. The most preferred glasses are essentially free of ZnO and consist essentially, expressed in terms of weight percent on the oxide basis, of

| | | | |
|---|---|---|---|
| $SiO_2$ | 66–71 | $Al_2O_3$ | 0.25–2 |
| $B_2O_3$ | 3–6 | CaO | 2.5–5 |
| $Na_2O$ | 7–10 | $Fe_2O_3$ | 3–5 |
| $K_2O$ | 8–11 | Se | 0.03–0.5 |
| $Na_2O + K_2O$ | 16–20 | NiO | 0.01–0.1. |

BRIEF DESCRIPTION OF APPENDED DRAWINGS

The appended drawing comprises a plot of chromaticity coordinates on a color mixture diagram utilizing Illuminant C.

Prior Art

The use of selenium as a colorant is known in the glass art. With respect to the base compositions of the inventive glasses, it is believed that the two U.S. patents discussed in some detail above, plus the compositions of Corning Code 8015 glass, Corning Code 8079 glass, and Bausch and Lomb B-15 glass, constitute the most pertinent prior art.

DESCRIPTION OF PREFERRED EMBODIMENTS

Table I records several base glass compositions, expressed in terms of parts by weight on the oxide basis, illustrating the instant invention. Because, however, the sum of the individual components totals or closely approximates 100, for all practical purposes the values listed may be considered to reflect weight percent. The actual batch ingredients for preparing the glasses may comprise any materials, either oxides or other compounds, which, when melted together, will be converted into the desired oxide in the proper proportions. To illustrate, $Na_2CO_3$ and $K_2CO_3$ can comprise a source of $Na_2O$ and $K_2O$, respectively.

The batch ingredients were compounded, thoroughly blended together to aid in obtaining a homogeneous melt, and charged into platinum crucibles. The crucibles were introduced into a furnace operating at about 1450° C., the batches melted for about 4 hours, the melts poured into steel molds to yield rectangular glass slabs having dimensions of about 25.4×10.2×1.3 cm (10"×4"×0.5"), and those slabs transferred immediately to an annealer operating at about 520° C.

Test samples were cut from the annealed slabs for measuring softening points, annealing points, strain points, linear coefficients of thermal expansion (25°–300° C.), densities, and indices of refraction. Measurements of chromaticity and transmittance at a wavelength of 380 nm were carried out on ground and polished plates of 2 mm thickness.

Whereas the description above is directed to laboratory melting and forming practice only, it must be appreciated that the glass compositions reported in Table I falling within the ranges of the subject invention can be melted and formed in much larger quantities employing conventional commercial glass melting units with standard glass forming equipment and techniques. It is only necessary that glass batches of appropriate formulations be prepared, those batches fired at a temperature and for a time sufficient to secure homogeneous melts, and those melts thereafter cooled and shaped into glass articles of a desired configuration. Customarily, those glass articles will be annealed.

TABLE I

| | 1 | 2 | 3 | 4 | 5 |
|---|---|---|---|---|---|
| $SiO_2$ | 69.1 | 69.3 | 68.7 | 68.7 | 68.7 |
| $B_2O_3$ | 4.2 | 4.3 | 4.3 | 4.3 | 4.3 |
| $Al_2O_3$ | 0.5 | 1.0 | 1.9 | 1.9 | 1.9 |
| $Na_2O$ | 8.4 | 9.0 | 8.7 | 8.7 | 8.7 |
| $K_2O$ | 9.9 | 8.9 | 8.8 | 8.9 | 8.8 |
| CaO | 4.0 | 3.2 | 3.2 | 3.2 | 3.2 |
| $Fe_2O_3$ | 4.0 | 3.9 | 3.9 | 3.9 | 3.9 |
| Se | 0.013 | 0.04 | 0.05 | 0.05 | 0.08 |
| NiO | 0.035 | 0.07 | — | 0.07 | — |
| $TiO_2$ | — | — | 0.15 | — | — |

As was noted above, the glasses of Table I can be fined using either $As_2O_3$ or a combination of NaCl and NaBr in amounts of less than 1%.

Table II recites softening points (S.P.), annealing points (A.P.), and strain points (St.P), expressed in °C., linear coefficients of thermal expansion (Exp) over the temperature range 25°–300° C., expressed in terms of $\times 10^{-7}/°C.$, densities (Den) in terms of $g/cm^3$, refractive indices ($n_D$), percent transmittance (Tran) at a wavelength of 380 nm at a thickness of 2 mm, and chromaticity values (Y,x,y) measured on polished samples of 2 mm thickness, all being determined employing techniques conventional in the glass art. Example 1 comprised the base glass composition for a study of the effects which excursions of iron, selenium, and nickel contents would have on the chromaticity values exhibited by the glass. Accordingly, because the variations in levels of the base glass components were relatively minor, it was deemed that the physical properties of Examples 2–5, except for the chromaticity data, would be similar to those in Example 1 and, hence, were not measured.

TABLE II

| | 1 | 2 | 3 | 4 | 5 |
|---|---|---|---|---|---|
| S.P. | 705 | — | — | — | — |
| A.P. | 531 | — | — | — | — |
| St.P. | 492 | — | — | — | — |
| Exp | 89.5 | — | — | — | — |
| Den | 2.501 | — | — | — | — |
| $n_D$ | 1.523 | — | — | — | — |
| Tran | 0.76 | 0.89 | 0.87 | 0.94 | 0.75 |
| Y | 14.9 | 11.7 | 17.9 | 13.1 | 15.1 |
| x | 0.4722 | 0.4289 | 0.4178 | 0.4087 | 0.4358 |
| y | 0.4008 | 0.4036 | 0.4029 | 0.4003 | 0.4055 |

In the "color box" of the appended drawing, Apices A, B, C, D, E, F, and G designate the following x, y coordinates.

| | x | y |
|---|---|---|
| A | 0.4075 | 0.3977 |
| B | 0.4520 | 0.4353 |
| C | 0.4703 | 0.4175 |
| D | 0.4875 | 0.4002 |
| E | 0.4467 | 0.3810 |
| F | 0.4317 | 0.3748 |
| G | 0.4352 | 0.3942 |

As can be observed from the measurements reported in Table II and as graphically represented in the appended drawing, composition control of the inventive glasses is vital to assure that the glasses will demonstrate the chromaticities included within the polygon delineated by Apices A, B, D, F, and A, while limiting the transmittance of the glass at a wavelength of 380 nm to less than 1%. Even more critical, of course, is composition control within the preferred color target area bounded by Apices C, D, E, G, and C.

Ground and polished lenses having a thickness of about 2 mm were immersed for 16 hours in a bath of molten $KNO_3$ operating at 450° C. The lenses were extracted from the bath, the salt rinsed off in tap water, and dried. The samples were divided into two groups; the members of the first group being subjected to the American Optical tumbling procedure, the ophthalmic glass industry standard procedure for abrading lenses to simulate abuse during normal service, and the members of the second group not. Table III records whether the lens had been abraded prior to the test and the mean failure height (MFH) measured over a total of 25 samples of each glass, along with the standard deviation in the measurements (Std. Dev.). The test involved dropping a steel ball having a diameter of about 1.6 cm (0.625") onto the center of the sample.

TABLE III

| Glass | Abraded | MFH | Std. Dev. |
|---|---|---|---|
| 1 | No | 10.42 m (34.21') | 1.55 m (5.11') |
| 1 | Yes | 3.96 m (13.01') | 0.49 m (1.61') |

It is immediately evident that the abraded strength evidenced by the chemically strengthened glasses of the present invention far exceeds the Federal Food and Drug Administration (FDA) "Drop Ball Test" requiring survival to a height of about 127 cm (50").

Example 1 is the most preferred embodiment.

We claim:

1. A transparent glass which, at a thickness of 2 mm, transmits less than 1% of ultraviolet radiation having a wavelength of 380 nm and exhibits a brown fixed tint bounded by apices A, B, D, F, A of the drawing, a purity between 48–70%, and a dominant wavelength between 580–588 nm, said glass having a composition consisting essentially, expressed in terms of weight percent on the oxide basis, of

| | | | |
|---|---|---|---|
| $SiO_2$ | 65–72 | CaO | 0–5.5 |
| $B_2O_3$ | 3–8 | ZnO | 0–4 |
| $Na_2O$ | 6–10 | CaO + ZnO | 2–5.5 |
| $K_2O$ | 7–12 | $Fe_2O_3$ | 3–5 |
| $Na_2O + K_2O$ | 15–20 | Se | 0.01–2 |
| $Al_2O_3$ | 0–4 | NiO | 0–0.12. |

2. A transparent glass according to claim 1 having a composition essentially free of ZnO.

3. A transparent glass according to claim 1 having a composition essentially free of ZnO and exhibiting a brown fixed tint bounded by apices C, D, E, G, C of the drawing, said glass consisting essentially of

| | | | |
|---|---|---|---|
| $SiO_2$ | 66–71 | $Al_2O_3$ | 0.25–2 |
| $B_2O_3$ | 3–6 | CaO | 2.5–5 |
| $Na_2O$ | 7–10 | $Fe_2O_3$ | 3–5 |
| $K_2O$ | 8–11 | Se | 0.03–0.5 |
| $Na_2O + K_2O$ | 16–20 | NiO | 0.01–0.1. |

* * * * *

UNITED STATES PATENT AND TRADEMARK OFFICE
CERTIFICATE OF CORRECTION

PATENT NO. : 5,403,789
DATED : April 4, 1995
INVENTOR(S) : David J. Kerko, Walter R. Lozano, David W. Morgan It is certified that error appears in the above-indentified patent and that said Letters Patent is hereby corrected as shown below:

Column 1, line 57, change "Cao" to --CaO--.

Column 7, line 25, change "(34.21')" to --(34.2')--, and "(5.11')" to --(5.1')--.

Column 7, line 26, change "(13.01')" to --(13.0')--, and "(1.61')" to --(1.6')--.

Signed and Sealed this

Third Day of October, 1995

Attest:

BRUCE LEHMAN

Attesting Officer

Commissioner of Patents and Trademarks